United States Patent
Chen et al.

(10) Patent No.: US 9,632,873 B1
(45) Date of Patent: Apr. 25, 2017

(54) STORAGE MANAGEMENT SYSTEM AND METHOD

(71) Applicant: EMC Corporation, Hopkinton, MA (US)

(72) Inventors: Xiaoqin Chen, Shanghai (CN); Jean-Pierre Bono, Westborough, MA (US); William C. Davenport, Burlington, MA (US); Yaming Kuang, Shanghai (CN); Yingchao Zhou, Beijing (CN); Marshall Hansi Wu, Shanghai (CN); Yunfei Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 74 days.

(21) Appl. No.: 14/673,017

(22) Filed: Mar. 30, 2015

(51) Int. Cl.
  *G06F 11/00* (2006.01)
  *G06F 11/14* (2006.01)
  *G06F 11/20* (2006.01)

(52) U.S. Cl.
  CPC ...... *G06F 11/1435* (2013.01); *G06F 11/1464* (2013.01); *G06F 11/2058* (2013.01); *G06F 11/2069* (2013.01); *G06F 2201/80* (2013.01); *G06F 2201/84* (2013.01)

(58) Field of Classification Search
  USPC .......................................................... 714/6.2
  See application file for complete search history.

(56) References Cited

U.S. PATENT DOCUMENTS

| 7,873,683 B2 * | 1/2011 | Dodge | G06F 17/30244 |
| | | | 707/824 |
| 9,069,797 B1 * | 6/2015 | Aliev | G06F 17/3023 |
| 9,298,555 B1 * | 3/2016 | Ai | G06F 11/1435 |

\* cited by examiner

*Primary Examiner* — Amine Riad
(74) *Attorney, Agent, or Firm* — Brian J. Colandreo; Mark H. Whittenberger; Holland & Knight LLP (57) ABSTRACT

A method, computer program product, and computing system for generating a first file system for use within a data storage array. A first temporary storage space is defined within the data storage array for use during a file system recovery event. The size of the first temporary storage space is defined based, at least in part, upon the actual utilization of the first file system.

21 Claims, 4 Drawing Sheets

FIG. 4

STORAGE MANAGEMENT SYSTEM AND METHOD

TECHNICAL FIELD

This disclosure relates to data recovery systems and, more particularly, to data recovery system for use within data storage arrays.

BACKGROUND

Storing and safeguarding electronic content is of paramount importance in modern business. Accordingly, large data storage systems may be utilized to protect such electronic content, wherein such large storage systems may be configured as data storage arrays to provide a high level of data availability. Additionally, such systems may be configured to recover in the event of data corruption. Unfortunately, current recovery methodologies require the use of a considerable amount of storage space to allow for such data recovery.

SUMMARY OF DISCLOSURE

In one implementation, a computer-implemented method is executed on a computing device. The computer-implemented method includes generating a first file system for use within a data storage array. A first temporary storage space is defined within the data storage array for use during a file system recovery event. The size of the first temporary storage space is defined based, at least in part, upon the actual utilization of the first file system.

One or more of the following features may be included. The size of the first temporary storage space may be adjusted based, at least in part, upon changes to the actual utilization of the first file system. N additional file systems may be generated for use within the data storage array. The data storage array may be configured to allow for X simultaneous file system recovery events. X−1 additional temporary storage spaces may be defined within the data storage array for use during file system recovery events. The first file system may be the most highly utilized file system. The size of the X−1 additional temporary storage spaces may be defined based, at least in part, upon the actual utilization of the most utilized X−1 additional file systems chosen from the N additional file systems. The size of the X−1 additional temporary storage spaces may be adjusted based, at least in part, upon changes to the actual utilization of the most utilized X−1 additional file systems chosen from the N additional file systems.

In another implementation, a computer program product resides on a computer readable medium that has a plurality of instructions stored on it. When executed by a processor, the instructions cause the processor to perform operations including generating a first file system for use within a data storage array. A first temporary storage space is defined within the data storage array for use during a file system recovery event. The size of the first temporary storage space is defined based, at least in part, upon the actual utilization of the first file system.

One or more of the following features may be included. The size of the first temporary storage space may be adjusted based, at least in part, upon changes to the actual utilization of the first file system. N additional file systems may be generated for use within the data storage array. The data storage array may be configured to allow for X simultaneous file system recovery events. X−1 additional temporary storage spaces may be defined within the data storage array for use during file system recovery events. The first file system may be the most highly utilized file system. The size of the X−1 additional temporary storage spaces may be defined based, at least in part, upon the actual utilization of the most utilized X−1 additional file systems chosen from the N additional file systems. The size of the X−1 additional temporary storage spaces may be adjusted based, at least in part, upon changes to the actual utilization of the most utilized X−1 additional file systems chosen from the N additional file systems.

In another implementation, a computing system includes at least one processor and at least one memory architecture coupled with the at least one processor, wherein the computing system is configured to perform operations including generating a first file system for use within a data storage array. A first temporary storage space is defined within the data storage array for use during a file system recovery event. The size of the first temporary storage space is defined based, at least in part, upon the actual utilization of the first file system.

One or more of the following features may be included. The size of the first temporary storage space may be adjusted based, at least in part, upon changes to the actual utilization of the first file system. N additional file systems may be generated for use within the data storage array. The data storage array may be configured to allow for X simultaneous file system recovery events. X−1 additional temporary storage spaces may be defined within the data storage array for use during file system recovery events. The first file system may be the most highly utilized file system. The size of the X−1 additional temporary storage spaces may be defined based, at least in part, upon the actual utilization of the most utilized X−1 additional file systems chosen from the N additional file systems. The size of the X−1 additional temporary storage spaces may be adjusted based, at least in part, upon changes to the actual utilization of the most utilized X−1 additional file systems chosen from the N additional file systems.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
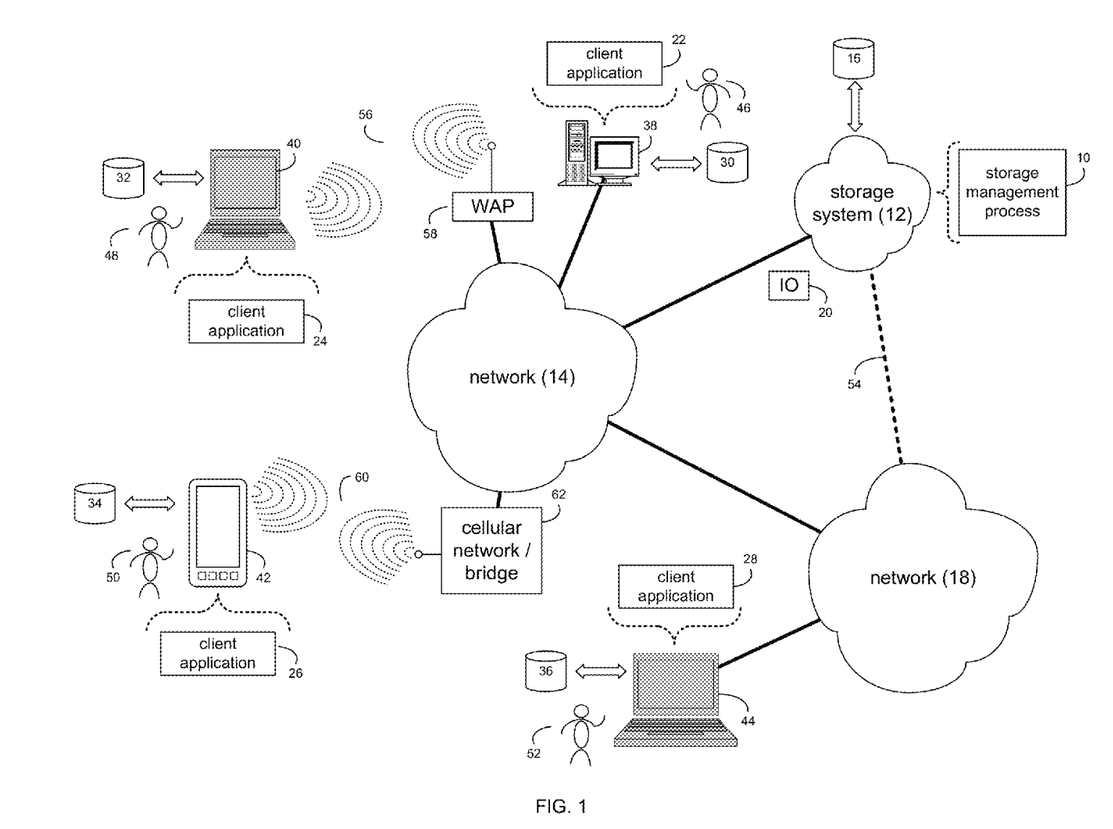
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet, a local area network, or a storage area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a tablet computer (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
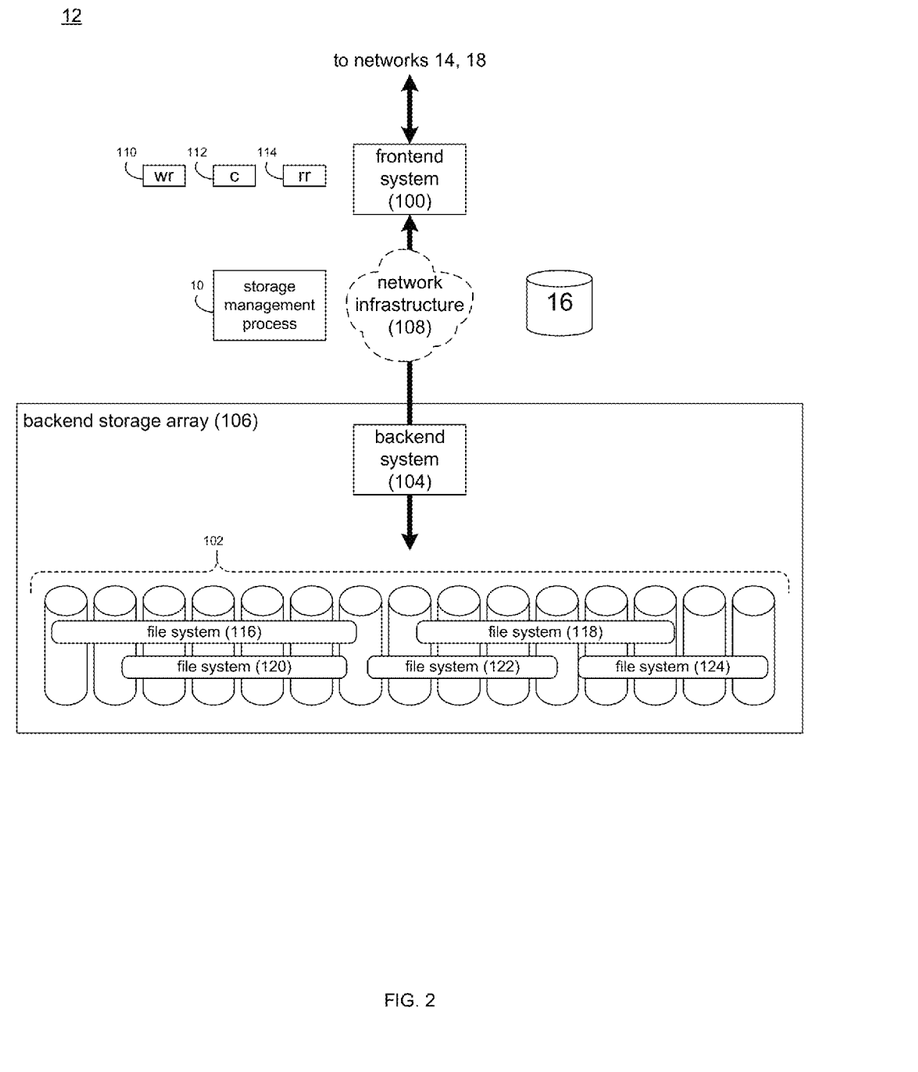
FIG. 2 is a diagrammatic view of the storage system of FIG. 1.

Referring also to FIG. 2, storage system 12 may include frontend system 100 and plurality of storage targets 102. The quantity of storage targets included within plurality of storage targets 102 may be increased or decreased depending upon e.g. the level of redundancy/performance/capacity required.

Plurality of storage targets 102 may be configured to provide various levels of performance and/or high availability. For example, a portion of plurality of storage targets 102 may be configured as a RAID 0 array, in which data is striped across storage targets. By striping data across a plurality of storage targets, improved performance may be realized. However, RAID 0 arrays do not provide a level of high availability. Accordingly, a portion of plurality of storage targets 102 may be configured as a RAID 1 array, in which data is mirrored between storage targets. By mirroring data between storage targets, a level of high availability is achieved as multiple copies of the data are stored within storage system 12.

While plurality of storage targets 102 is discussed above as being configured in a RAID 0 or RAID 1 array, this is for illustrative purposes only and is not intended to be a limitation of this disclosure, as other configurations are possible. For example, plurality of storage targets 102 may be configured as a RAID 3, RAID 4, RAID 5 or RAID 6 array.

Plurality of storage targets 102 may include one or more coded targets. As is known in the art, a coded target may be used to store coded data that may allow for the regeneration of data lost/corrupted on one or more of plurality of storage targets 102. An example of such a coded target may include but is not limited to a hard disk drive that is used to store parity data within a RAID array. The quantity of coded targets included within plurality of storage targets 102 may be increased or decreased depending upon e.g. the level of redundancy/performance/capacity required.

Examples of plurality of storage targets 102 may include one or more electro-mechanical hard disk drives and/or solid-state/flash devices, wherein the combination of plurality of storage targets 102 and processing/control systems (e.g., backend system 104) may form backend storage array 106.

The manner in which storage system 12 is implemented may vary depending upon e.g. the level of redundancy/performance/capacity required. For example, storage system 12 may be a RAID device in which frontend system 100 is a RAID controller card and plurality of storage targets 102 are individual "hot-swappable" hard disk drives. An example of such a RAID device may include but is not limited to an NAS device. Alternatively, storage system 12 may be configured as a SAN, in which frontend system 100 may be e.g., a server computer and each of plurality of storage targets 102 may be a RAID device and/or computer-based hard disk drive. Further still, one or more of plurality of storage targets 102 may be a SAN.

In the event that storage system 12 is configured as a SAN, the various components of storage system 12 (e.g. frontend system 100, plurality of storage targets 102, and backend system 104) may be coupled using network infrastructure 108, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to frontend system 100 and/or backend system 104, may be executed by one or more processors (not shown) and one or more memory architectures (not shown) included within frontend system 100 and/or backend system 104. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when frontend system 100 is configured as an application server, these IO requests may be internally generated within frontend system 100. Examples of IO request 20 may include but are not limited to data write request 110 (i.e. a request that content 112 be written to storage system 12) and data read request 114 (i.e. a request that content 112 be read from storage system 12).

During operation of frontend system 100, content 112 to be written to storage system 12 may be processed by frontend system 100. Additionally/alternatively and when frontend system 100 is configured as an application server, content 112 to be written to storage system 12 may be internally generated by frontend system 100.

File System Generation:

As discussed above, storage system 12 may include frontend system 100 and plurality of storage targets 102, wherein plurality of storage targets 102 may be configured to store data (e.g., content 112). In order to enable the storage of such data, plurality of storage targets 102 may be configured to include one of more file systems (e.g., file systems 116, 118, 120, 122, 124). Such file system may be configured as mappable storage space that may be accessed by e.g., a computer running Microsoft Windows or an Apple Macintosh operating system, examples of which may include but are not limited to personal computer 38, laptop computer 40 and notebook computer 44.

Unfortunately and as is known in the art, such file systems may become corrupt over time for various reasons. Fortunately, storage management process 10 may be configured to recover such corrupt file systems through the use of various recovery methodologies. However, in order to effectuate such recovery methodologies, storage management process 10 may need to have temporary storage space available within plurality of storage targets 102 that may be used for various utilitarian purposes required to effectuate the recovery, example of which may include but are not limited to the writing of metadata, the temporary storage of files, and the reconstruction of data. Unfortunately, such temporary storage space may be considerable in size (e.g., up to 50% of the file system storage space) and, therefore, may drastically reduce the total storage capacity of (in this example) plurality of storage targets 102.

Figure 3:
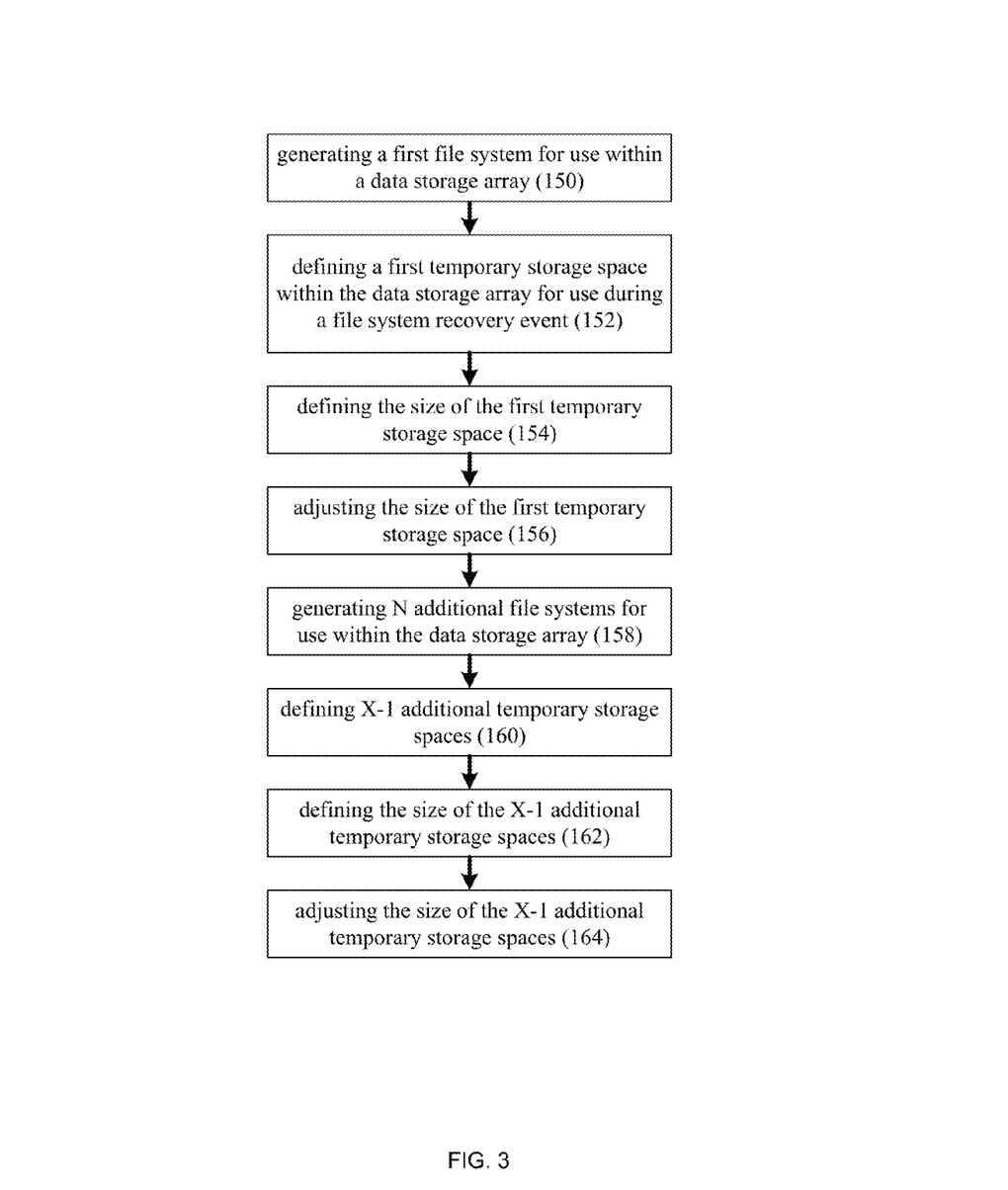
FIG. 3 is a flow chart of one implementation of the storage management process of FIG. 1.
Figure 4:
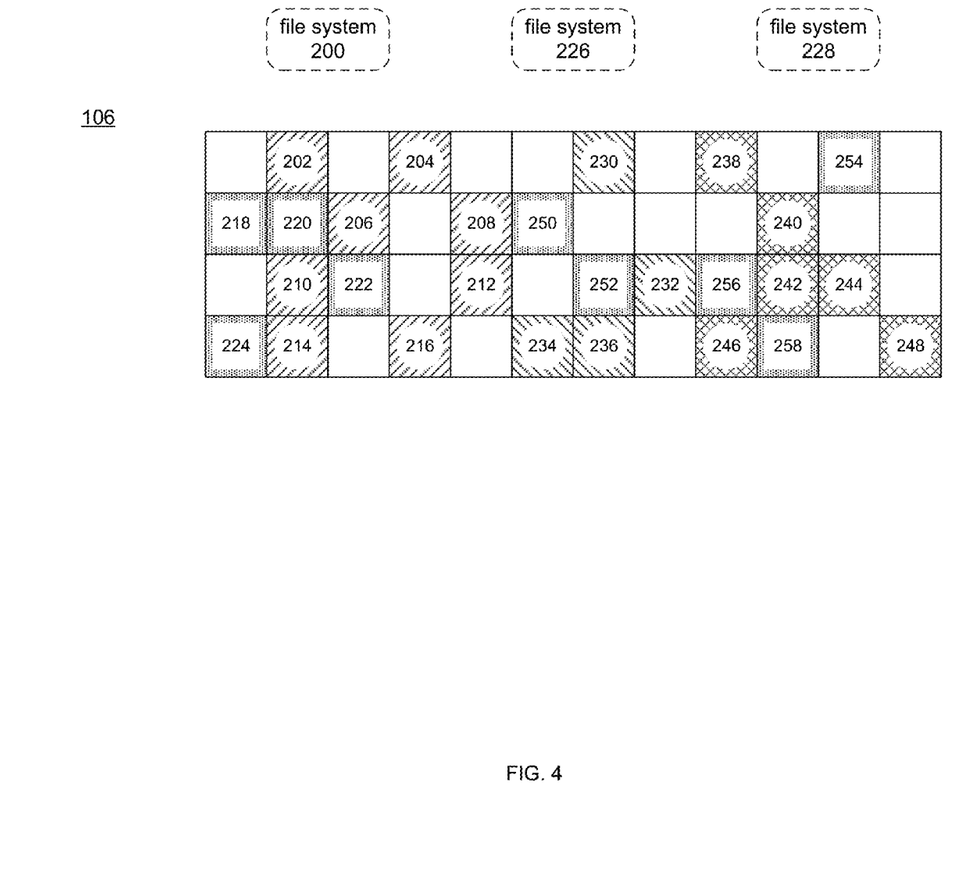
FIG. 4 is a diagrammatic view of a plurality of storage slices for use with the storage management process of FIG. 1.

Referring also to FIGS. 3-4 and as is known in the art, storage space within e.g., plurality of storage targets 102 may be divided into smaller storage portions known as storage slices (represented by the various discrete blocks within FIG. 4). A typical example of such a storage slice may include discrete 256 megabyte portions of data storage, wherein these storage slices may be assigned by storage management process 10 to form such file systems (e.g., file systems 116, 118, 120, 122, 124).

As is known in the art, these file systems (e.g., file systems 116, 118, 120, 122, 124) may be thinly provisioned. For example, storage management process 10 may define a maximum capacity for a file system, wherein individual storage slices may be assigned to (or removed from) the file systems on an "as needed" basis. Accordingly, when e.g., file system 116 is initially defined, it may not have any data stored within it. Therefore, file system 116 may initially have zero storage slices assigned to it (or a de minimus quantity of storage slices that may be required to maintain file system 116). However, as data is written to file system 116, storage slices may be assigned to file system 116 and, conversely, as data is removed from file system 116, storage slices may be unassigned (i.e., removed from) file system 116.

Assume for illustrative purposes that storage management process 10 may generate 150 a first file system (e.g., file system 200) for use within a data storage array (e.g., backend storage array 106). Assume for this example that storage management process 10 assigns a maximum capacity to file system 200 that equates to eight storage slices (e.g., data storage slices 202, 204, 206, 208, 210, 212, 214, 216).

As discussed above, in order to effectuate the above-described recovery methodologies, storage management process 10 may need to have a temporary storage space available within plurality of storage targets 102. Accordingly, storage management process 10 may define 152 a first temporary storage space within the data storage array (e.g., backend storage array 106) for use during file system recovery events, wherein storage management process 10 may define 154 the size of this first temporary storage space based, at least in part, upon the actual utilization of first file system 116.

For this example, assume that storage management process 10 requires a 1:2 ratio of temporary storage slices to data storage slices in order to accomplish a file system recovery event. Accordingly, storage management process 10 may define 152 a quantity of temporary storage slices that corresponds to 50% of the data storage slices actually utilized by file system 200. For example and as discussed above, when storage management process 10 generated 150 file system 200, file system 200 was assigned a maximum capacity equivalent to eight data storage slices (e.g., data storage slices 202, 204, 206, 208, 210, 212, 214, 216). Further and as stated above, storage management process 10 may define 154 the size of the temporary storage space based, at least in part, upon the actual utilization of first file system 116. Accordingly, in the event that the actual utilization of file system 116 is zero data storage slices, storage management process 10 may define 154 the temporary storage space to include zero temporary storage slices. Further, in the event that the actual utilization of file system 116 is eight data storage slices (e.g., data storage slices 202, 204, 206, 208, 210, 212, 214, 216), storage management process 10 may define 154 the temporary storage space to include four temporary storage slices (e.g., temporary storage slices 218, 220, 222, 224).

As stated above, file systems may be thinly provisioned, wherein data storage slices may be assigned to (or removed from) the file system on an "as needed" basis. Accordingly, storage management process 10 may adjust 156 the size of the first temporary storage space based, at least in part, upon changes to the actual utilization of (in this example) first file system 200. Therefore, if file system 200 is initially utilizing eight data storage slices (e.g., data storage slices 202, 204, 206, 208, 210, 212, 214, 216), storage management process 10 may define 154 the temporary storage space to include four temporary storage slices (e.g., temporary storage slices 218, 220, 222, 224). Further, if the utilization of file system 200 drops to four data storage slices (e.g., data storage slices 202, 204, 206, 208), storage management process 10 may adjust 156 the size of the first temporary storage space to include two temporary storage slices (e.g., temporary storage slices 218, 220), thus releasing storage slices 222, 224 for use with another storage task. Accordingly, by adjusting 156 the size of the temporary storage space based, at least in part, upon changes to the actual utilization of a corresponding file system (e.g., first file system 200), storage slices that were initially assigned as temporary storage slices may be released when no longer needed due to a reduced level of utilization by the corresponding file system.

Storage management process 10 may generate 158 N additional file systems for use within the data storage array (e.g., backend storage array 106). For example, assume that storage management process 10 generates 158 two additional file systems (e.g., file systems 226, 228) for use within the data storage array (e.g., backend storage array 106). Assume for this example that storage management process 10 assigns a maximum capacity to file system 226 that equates to four storage slices (e.g., data storage slices 230, 232, 234, 236). Further assume that storage management process 10 assigns a maximum capacity to file system 228 that equates to six storage slices (e.g., data storage slices 238, 240, 242, 244, 246, 248).

As stated above, storage management process 10 (for this example) requires a 1:2 ratio of temporary storage slices to data storage slices in order to accomplish a file system recovery event. Accordingly, storage management process 10 may define 152 a quantity of temporary storage slices that corresponds to 50% of the data storage slices utilized by file system 200. When storage management process 10 generated 158 file systems 226, 228, they were assigned maximum capacities equivalent to four and six data storage slices (respectively), namely data storage slices 230, 232, 234, 236 and data storage slices 238, 240, 242, 244, 246, 248 (respectively).

Further and as stated above, storage management process 10 may define the size of a temporary storage space based (at least in part) upon the actual utilization of the related file system. Accordingly and for file system 226, storage management process 10 may define the related temporary storage space to include a maximum of two temporary storage slices (e.g., temporary storage slices 250, 252) in the event that file system 226 is fully utilized. Further and for file system 228, storage management process 10 may define the related temporary storage space to include a maximum of three temporary storage slices (e.g., temporary storage slices 254, 256, 258) in the event that file system 228 is fully utilized.

Further and as discussed above, storage management process 10 may adjust the size of these temporary storage spaces (e.g., temporary storage slices 250, 252 and temporary storage slices 254, 256, 258) based, at least in part, upon changes to the actual utilization of the corresponding file system (e.g., file system 226 and file system 228, respectively). Therefore and as discussed above, storage slices that were initially assigned as temporary storage slices may be released when no longer needed due to a reduced level of utilization by the corresponding file system.

Maximum Recovery Events:

As discussed above, storage management process 10 may be configured to recover corrupt file systems through the use of various recovery methodologies. Unfortunately, storage management process 10 may only be capable of simultaneously performing a limited number of file system recovery events. Further, since the above-described temporary storage spaces (e.g., temporary storage slices 218, 220, 222, 224/ temporary storage slices 250, 252/temporary storage slices 254, 256, 258) are only used during a system recovery event, storage management process 10 may be configured to limit the quantity of temporary storage spaces to the number of file system recovery events that can be performed simultaneously.

For the following example, assume that storage management process 10 may only allow two simultaneous file system recovery events. Accordingly and in such a configuration, storage management process 10 may be configured to define two temporary storage spaces (i.e., equivalent to the maximum number of simultaneous file system recovery events). Continuing with the above-stated example in which storage management process 10 defined 152 a first temporary storage space (e.g., temporary storage slices 218, 220, 222, 224) for file system 200 and then generated 158 two additional file systems (e.g., file systems 226, 228) for use within the data storage array (e.g., backend storage array 106), storage management process 10 may define 160 one additional temporary storage space within the data storage array (e.g., backend storage array 106) for use during file system recovery events. Since storage management process 10 defines 160 only one additional temporary storage space for two additional file system (e.g., file systems 226, 228), storage slices that would have been used for the third temporary storage space may be released and utilized for other storage operations and/or procedures.

While storage management process 10 may limit the quantity of temporary storage spaces to the quantity of file system recovery events that may be performed simultaneously, storage management process 10 may be configured to ensure that the two temporary storage spaces defined are sufficiently large to handle any possible combination of file system recovery events.

For the following example, assume that first file system 200 is the most highly utilized file system and currently is utilizing all eight data storage slices (e.g., data storage slices 202, 204, 206, 208, 210, 212, 214, 216). Further, assume that file systems 226, 228 are both utilized to maximum capacity. Specifically, file system 226 is utilizing four data storage slices (e.g., data storage slices 230, 232, 234, 236) and file system 228 is utilizing six data storage slices (e.g., data storage slices 238, 240, 242, 244, 246, 248).

Accordingly, storage management process 10 may require four temporary storage slices (e.g., temporary storage slices 218, 220, 222, 224) to recover file system 200; may require two temporary storage slices (e.g., temporary storage slices 250, 252) to recover file system 226; and may require three temporary storage slices (e.g., temporary storage slices 254, 256, 258) to recover file system 228. Therefore, storage management process 10 may be able to simultaneously handle any two file system recovery events as long as one of the temporary storage spaces includes four temporary storage slices and the other temporary storage space includes three temporary storage slices.

Continuing with the above-stated example in which storage management process 10 defined 152 a first temporary storage space (e.g., temporary storage slices 218, 220, 222, 224) for file system 200, storage management process 10 may define 162 the size of the one additional temporary storage space based, at least in part, upon the actual utilization of the most utilized additional file systems chosen from the two additional file systems (e.g., file systems 226, 228).

As discussed above, file system 226 is utilizing four data storage slices (thus requiring two temporary storage slices) and file system 228 is utilizing six data storage slices (thus requiring three temporary storage slices). Accordingly, storage management process 10 may define 162 the size of the additional temporary storage space as three temporary storage slices (e.g., temporary storage slices 254, 256, 258). Accordingly, storage slices that would have been used for the third temporary storage space (e.g., temporary storage slices 250, 252) may be released and utilized for other storage operations and/or procedures.

Storage management process 10 may be configured to adjust 164 the size of the temporary storage spaces based, at least in part, upon changes in the actual utilization of the file systems. For example, assume for the following example that first file system 200 is still utilizing all eight data storage slices (e.g., data storage slices 202, 204, 206, 208, 210, 212, 214, 216) and file system 226 is still utilizing all four data storage slices (e.g., data storage slices 230, 232, 234, 236). However, file system 228 is now utilizing only two data storage slices (e.g., data storage slices 238, 240), down from six data slices. Accordingly, storage management process 10 may now require only one temporary storage slice (e.g., temporary storage slices 254). Accordingly, storage management process 10 may be configured to adjust 164 the size of the additional temporary storage space based, at least in part, upon changes to the actual utilization of the most utilized additional file systems. Since file system 226 is now utilized more than file system 228, storage management process 10 may adjust 164 the size of the additional temporary storage space down to two storage slices (as opposed to three storage slices), since file system 226 is utilizing four data storage slices and file system 228 is now utilizing only two data storage slices (down from six data storage slices). Again and as discussed above, this released temporary storage slice may be utilized for other storage operations and/or procedures.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, the computer-implemented method comprising:
    generating a first file system for use within a data storage array;
    defining a first temporary storage space within the data storage array for use during a file system recovery event; and
    defining a size of the first temporary storage space based, at least in part, upon actual utilization of the first file system.

2. The computer-implemented method of claim 1 further comprising:
    adjusting the size of the first temporary storage space based, at least in part, upon changes to the actual utilization of the first file system.

3. The computer-implemented method of claim 2 further comprising:
    generating N additional file systems for use within the data storage array.

4. The computer-implemented method of claim 3 wherein the data storage array is configured to allow for only simultaneous file system recovery events when N additional file systems are generated, the method further comprising:
    defining additional temporary storage spaces within the data storage array for use during file system recovery events, when N additional file systems are generated, as the number of simultaneous file system recovery events minus one.

5. The computer-implemented method of claim 4 wherein the first file system is the most highly utilized file system.

6. The computer-implemented method of claim 5 further comprising:
    defining a size of the additional temporary storage spaces for use during file system recovery events when N additional file systems are generated based, at least in part, upon actual utilization of most utilized additional file systems chosen from the N additional file systems as the number of simultaneous file system recovery events minus one.

7. The computer-implemented method of claim 6 further comprising:
    adjusting the size of the additional temporary storage spaces for use during file system recovery events when N additional file systems are generated based, at least in part, upon changes to the actual utilization of the most utilized additional file systems chosen from the N additional file systems, wherein the number of the most utilized additional file systems is the number of simultaneous file system recovery events minus one.

8. A computer program product residing on a non-transitory computer readable medium having a plurality of instructions stored thereon which, when executed by a processor, cause the processor to perform operations comprising:
    generating a first file system for use within a data storage array;
    defining a first temporary storage space within the data storage array for use during a file system recovery event; and
    defining a size of the first temporary storage space based, at least in part, upon actual utilization of the first file system.

9. The computer program product of claim 8 further comprising:
    adjusting the size of the first temporary storage space based, at least in part, upon changes to the actual utilization of the first file system.

10. The computer program product of claim 9 further comprising:
    generating N additional file systems for use within the data storage array.

11. The computer program product of claim 10 wherein the data storage array is configured to allow for only simultaneous file system recovery events when N additional file systems are generated, the method further comprising:
    defining additional temporary storage spaces within the data storage array for use during file system recovery events, when N additional file systems are generated, as the number of simultaneous file system recovery events minus one.

12. The computer program product of claim 11 wherein the first file system is the most highly utilized file system.

13. The computer program product of claim 12 further comprising:
defining a size of the additional temporary storage spaces for use during file system recovery events when N additional file systems are generated based, at least in part, upon actual utilization of most utilized additional file systems chosen from the N additional file systems as the number of simultaneous file system recovery events minus one.

14. The computer program product of claim 13 further comprising:
adjusting the size of the additional temporary storage spaces for use during file system recovery events when N additional file systems are generated based, at least in part, upon changes to the actual utilization of the most utilized additional file systems chosen from the N additional file systems, wherein the number of the most utilized additional file systems is the number of simultaneous file system recovery events minus one.

15. A computing system including a processor and memory configured to perform operations comprising:
generating, by the processor, a first file system for use within a data storage array;
defining a first temporary storage space within the data storage array for use during a file system recovery event; and
defining a size of the first temporary storage space based, at least in part, upon actual utilization of the first file system.

16. The computing system of claim 15 further comprising:
adjusting the size of the first temporary storage space based, at least in part, upon changes to the actual utilization of the first file system.

17. The computing system of claim 16 further comprising:
generating N additional file systems for use within the data storage array.

18. The computing system of claim 17 wherein the data storage array is configured to allow for only simultaneous file system recovery events when N additional file systems are generated, the method further comprising:
defining additional temporary storage spaces within the data storage array for use during file system recovery events, when N additional file systems are generated, as the number of simultaneous file system recovery events minus one.

19. The computing system of claim 18 wherein the first file system is the most highly utilized file system.

20. The computing system of claim 19 further comprising:
defining a size of the additional temporary storage spaces for use during file system recovery events when N additional file systems are generated based, at least in part, upon actual utilization of most utilized additional file systems chosen from the N additional file systems as the number of simultaneous file system recovery events minus one.

21. The computing system of claim 20 further comprising:
adjusting the size of the additional temporary storage spaces for use during file system recovery events when N additional file systems are generated based, at least in part, upon changes to the actual utilization of the most utilized additional file systems chosen from the N additional file systems, wherein the number of the most utilized additional file systems is the number of simultaneous file system recovery events minus one.

* * * * *